United States Patent
Peng-Poehler et al.

(10) Patent No.: US 11,912,867 B2
(45) Date of Patent: Feb. 27, 2024

(54) POLYURETHANE AND UV-MOISTURE DUAL CURE PU REACTIVE HOTMELT COMPRISING THE SAME

(71) Applicant: BASF SE, Ludwigshafen am Rhein (DE)

(72) Inventors: Xuyuan Peng-Poehler, Ludwigshafen (DE); Yun Fei Guo, Shanghai (CN); Li Chen, Shanghai (CN)

(73) Assignee: BASF SE, Ludwigshafen Am Rhein (DE)

( * ) Notice: Subject to any disclaimer, the term of this patent is extended or adjusted under 35 U.S.C. 154(b) by 204 days.

(21) Appl. No.: 17/426,777

(22) PCT Filed: Jan. 14, 2020

(86) PCT No.: PCT/EP2020/050803
§ 371 (c)(1),
(2) Date: Jul. 29, 2021

(87) PCT Pub. No.: WO2020/156802
PCT Pub. Date: Aug. 6, 2020

(65) Prior Publication Data
US 2022/0098405 A1    Mar. 31, 2022

(30) Foreign Application Priority Data

Feb. 1, 2019  (WO) ................ PCT/CN2019/074457

(51) Int. Cl.
| | |
|---|---|
| *C08L 75/14* | (2006.01) |
| *C09J 7/35* | (2018.01) |
| *C08G 18/81* | (2006.01) |
| *B29C 64/129* | (2017.01) |
| *C09J 7/32* | (2018.01) |
| *C08G 18/12* | (2006.01) |
| *C08G 18/40* | (2006.01) |
| *C08G 18/42* | (2006.01) |
| *C08G 18/48* | (2006.01) |
| *C08G 18/72* | (2006.01) |
| *C08G 18/76* | (2006.01) |
| *C08K 5/21* | (2006.01) |
| *B33Y 10/00* | (2015.01) |
| *B33Y 70/00* | (2020.01) |
| *B33Y 80/00* | (2015.01) |

(52) U.S. Cl.
CPC ............ *C08L 75/14* (2013.01); *B29C 64/129* (2017.08); *C08G 18/12* (2013.01); *C08G 18/4018* (2013.01); *C08G 18/4202* (2013.01); *C08G 18/4804* (2013.01); *C08G 18/728* (2013.01); *C08G 18/7671* (2013.01); *C08G 18/8125* (2013.01); *C08K 5/21* (2013.01); *C09J 7/32* (2018.01); *C09J 7/35* (2018.01); *B33Y 10/00* (2014.12); *B33Y 70/00* (2014.12); *B33Y 80/00* (2014.12); *C08G 2170/20* (2013.01); *C09J 2301/304* (2020.08); *C09J 2301/306* (2020.08); *C09J 2301/416* (2020.08); *C09J 2475/00* (2013.01)

(58) Field of Classification Search
CPC . C08L 75/14; C08G 18/4202; C08G 18/8125; C08G 18/728; C09J 7/35; C09J 7/32
See application file for complete search history.

(56) References Cited

U.S. PATENT DOCUMENTS

| | | | |
|---|---|---|---|
| 6,617,413 B1* | 9/2003 | Bruchmann | C08G 18/672 427/508 |
| 9,453,142 B2 | 9/2016 | Rolland et al. | |
| 2015/0099125 A1* | 4/2015 | Kanagawa | C08G 18/4009 525/131 |
| 2015/0259568 A1 | 9/2015 | Schwalm et al. | |
| 2017/0233580 A1* | 8/2017 | Saito | C08G 18/8125 522/9 |
| 2018/0133953 A1 | 5/2018 | Achten et al. | |
| 2019/0375153 A1* | 12/2019 | Achten | C08G 18/4238 |

FOREIGN PATENT DOCUMENTS

CN          105255435 A          1/2016

OTHER PUBLICATIONS

International Search Report and Written Opinion for corresponding PCT/EP2020/050803 dated Mar. 30, 2020, 8 Pages.

* cited by examiner

*Primary Examiner* — Michael L Leonard
(74) *Attorney, Agent, or Firm* — Armstrong Teasdale LLP

(57) ABSTRACT

Described herein is a polyurethane having an isocyanate group and having C—C double bonds on a side chain, a process for preparing such a polyurethane, and an UV-moisture dual cure polyurethane reactive hotmelt including the polyurethane.

23 Claims, No Drawings

POLYURETHANE AND UV-MOISTURE DUAL CURE PU REACTIVE HOTMELT COMPRISING THE SAME

CROSS-REFERENCE TO RELATED APPLICATIONS

This application is a U.S. National Phase Application of International Patent Application No. PCT/EP2020/050803, filed Jan. 14, 2020, which claims priority to International Patent Application No. PCT/CN2019/074457, filed Feb. 1, 2019, the entire contents of which are hereby incorporated by reference herein.

TECHNOLOGY FIELD

The invention relates to a polyurethane having an isocyanate group and having C—C double bonds on the side chain, to a process for preparing said polyurethane, to an UV-moisture dual cure polyurethane reactive hotmelt comprising said polyurethane and to the use of the hotmelt as adhesive or in additive manufacturing as well as a three-dimensional object produced from the hotmelt.

BACKGROUND

Low application viscosity of polyurethane reactive hotmelt (PU RHM) is desired for fast and easy application process in adhesives area and additive manufacturing (3D printing), but the disadvantage is that it takes time to build up sufficient strength for further handling steps. Therefore, the challenge is to develop a PU RHM system with low viscosity, short setting time and in the mean time having fast green strength building-up properties.

CN105255435A discloses a method for preparing an optical/wet dual-curable polyurethane hotmelt, which comprises a very complex three-steps synthesis. In addition, HDI trimer is used, which may lead to high viscosity of the hotmelt and the low impact strength of the cured product.

U.S. Pat. No. 9,453,142B2 discloses a polymerizable liquid useful for the production of a three-dimensional object comprised of polyurethane, polyurea, or a copolymer thereof by additive manufacturing, said polymerizable liquid comprising a mixture of: (i) a blocked or reactive blocked prepolymer, (ii) a blocked or reactive blocked diisocyanate, or (iii) a blocked or reactive blocked diisocyanate chain extender. However, A very complexed 2 component system is used in U.S. Pat. No. 9,453,142B2 which requires multi step of chemistry synthesis of the blocked diisocyanate or prepolymer; a special complicated design of the 3D printing machine; the dead layer in U.S. Pat. No. 9,453,142B2 is wasting materials; toughness of the printed objects is not so good.

SUMMARY OF THE INVENTION

It is an object of the invention to provide a polyurethane so that an UV-moisture dual cure polyurethane reactive hotmelt with low viscosity, short setting time and in the mean time having fast green strength building-up properties could be obtained by using said polyurethane.

Another object of the present invention is to provide a process for preparing the polyurethane.

A further object of the present invention is to provide an UV-moisture dual cure polyurethane reactive hotmelt comprising the polyurethane of the present invention.

A further object of the present invention is to provide a method for manufacturing a three-dimensional object by using the UV-moisture dual cure polyurethane reactive hotmelt as well as the three-dimensional object with high toughness obtainable by said method.

It has been surprisingly found that the above objects can be achieved by following embodiments:

1. A polyurethane which has an isocyanate group and has C—C double bonds on the side chain, wherein the isocyanate in the isocyanate component for synthesizing the polyurethane is diisocyanate and the isocyanate component comprises at least one diisocyanate having C—C double bonds on the side chain.
2. The polyurethane according to item 1, wherein the amount of the C—C double bond is 0.07 to 0.5 mol/kg, preferably, 0.09 to 0.45 mol/kg, based on the total weight of the polyurethane.
3. The polyurethane according to item 1 or 2, wherein the content of isocyanate group is in the range from 0.2 to 6% by weight, preferably 0.8 to 5% by weight, based on the total weight of the polyurethane.
4. The polyurethane according to any of items 1 to 3, wherein the polyurethane is obtained from the reaction of the isocyanate component with a polyol component.
5. The polyurethane according to any of items 1 to 4, wherein the average number of C—C double bond in the diisocyanate having C—C double bonds on the side chain is 1 to 6 per molecule, preferably 1.5 to 4 per molecule.
6. The polyurethane according to any of items 1 to 5, wherein the amount of the diisocyanate having C—C double bonds on the side chain is in the range from 5 to 35% by weight, preferably 8 to 20% by weight, based on the total weight of the isocyanate component and the polyol component.
7. The polyurethane according to any of items 1 to 6, wherein the isocyanate component comprises at least one further isocyanate and said further isocyanate is diisocyanate.
8. The polyurethane according to any of items 4 to 7, wherein the polyol component comprises at least one crystalline polyester polyol and/or at least one non-crystalline polyester polyol.
9. The polyurethane according to item 8, wherein the crystalline polyester polyol has a hydroxyl number in the range from 15 to 50 mg KOH/g, preferably from 20 to 40 mg KOH/g.
10. The polyurethane according to item 8 or 9, wherein the non-crystalline polyester polyol has a hydroxyl number in the range from 10 to 80 mg KOH/g, preferably 20 to 50 mg KOH/g.
11. The polyurethane according to any of items 8 to 10, wherein the amount of crystalline polyester polyol is in the range from 4 to 80% by weight, preferably 10 to 65% by weight, based on the total weight of the isocyanate component and the polyol component.
12. The polyurethane according to any of items 8 to 11, wherein the amount of non-crystalline polyester polyol is in the range from 1 to 30% by weight, preferably 2 to 15% by weight, based on the total weight of the isocyanate component and the polyol component.
13. The polyurethane according to any of items 4 to 12, wherein the polyol component comprises 0 to 75% by weight, preferably from 5 to 60% by weight of at least one crystalline polyether polyol.

14. The polyurethane according to any of items 4 to 13, wherein the polyol component comprises 0 to 10% by weight of at least one non-crystalline polyether polyol.
15. The polyurethane according to any of items 4 to 13, wherein isocyanate component comprises:
5 to 35% by weight, preferably 8 to 20% by weight of the diisocyanate having C—C double bonds on the side chain;
0 to 20% by weight, preferably 8 to 20% by weight of at least one further isocyanate and said further isocyanate being diisocyanate;
and
the polyol component comprises:
8 to 80% by weight, preferably 12 to 65% by weight of at least one crystalline polyester polyol;
1 to 30% by weight, preferably 2 to 15% by weight of at least one non-crystalline polyester polyol;
0 to 60% by weight, preferably 5 to 60% by weight of at least one crystalline polyether polyol;
0 to 10% by weight of at least one non-crystalline polyether polyol;
wherein the weight % is based on total weight of the isocyanate component and the polyol component.
16. The polyurethane according to any of items 4 to 13, wherein isocyanate component comprises:
5 to 35% by weight, preferably 8 to 20% by weight of the diisocyanate having C—C double bonds on the side chain;
0 to 20% by weight, preferably 8 to 20% by weight of at least one further isocyanate and said further isocyanate being diisocyanate;
and
the polyol component comprises:
4 to 80% by weight, preferably 10 to 65% by weight of at least one crystalline polyester polyol;
1 to 30% by weight, preferably 2 to 15% by weight of at least one non-crystalline polyester polyol;
0 to 75% by weight, preferably 5 to 60% by weight of at least one crystalline polyether polyol;
0 to 10% by weight of at least one non-crystalline polyether polyol;
wherein the weight % is based on total weight of the isocyanate component and the polyol component.
17. The polyurethane according to any of items 4 to 16, wherein the polyols used in the polyol component have a functionality of 2.
18. A method for preparing the polyurethane according to any of items 1 to 17, which comprises reacting an isocyanate component with a polyol component to obtain the polyurethane having an isocyanate group and having C—C double bonds on the side chain, wherein the isocyanate component comprises at least one diisocyanate having C—C double bonds on the side chain.
19. An UV-moisture dual cure polyurethane reactive hotmelt comprising at least one polyurethane according to any of items 1 to 17 and at least one photoinitiator.
20. The UV-moisture dual cure polyurethane reactive hotmelt according to item 19, which further comprises at least one urea reaction catalyst.
21. Use of the UV-moisture dual cure polyurethane reactive hotmelt according to item 19 or 20 as adhesive or in additive manufacturing.
22. A method for manufacturing a three-dimensional object by using the UV-moisture dual cure polyurethane reactive hotmelt as defined in item 19 or 20.
23. The method according to item 22, which comprises a step of forming a layer of UV-moisture dual cure polyurethane reactive hotmelt as defined in item 19 or 20 and irradiating the layer with the UV light to set the layer, repeating the step until the three-dimensional object is formed.
24. The method according to item 23, wherein the method is an additive manufacturing (3D printing) method.
25. A three-dimensional object obtainable by the method according to any of items 22 to 24.

EMBODIMENT OF THE INVENTION

One aspect of the present invention is directed to a polyurethane which has an isocyanate group and has C—C double bonds on the side chain, wherein the isocyanate in the isocyanate component for synthesizing the polyurethane is diisocyanate and the isocyanate component comprises at least one diisocyanate having C—C double bonds on the side chain.

The undefined article "a", "an", "the" means one or more of the species designated by the term following said article.

The amount of the C—C double bond is 0.07 to 0.5 mol/kg, for example 0.08 to 0.45, 0.09 to 0.40, 0.09 to 0.35, 0.09 to 0.30, 0.10 to 0.25, 0.10 to 0.20, 0.10 to 0.15 mol/kg, preferably, 0.09 to 0.45 mol/kg, based on the total weight of the polyurethane.

The content of isocyanate group can be in the range from 0.2 to 6% by weight, for example 0.5 to 6, 1 to 5, 1.5 to 4.5, 2 to 4, 2.5 to 4.5, 2.5 to 4% by weight, preferably 0.8 to 5% by weight, based on the total weight of the polyurethane.

According to one embodiment, the polyurethane is obtained from the reaction of an isocyanate component with a polyol component, and wherein the isocyanate component comprises at least one diisocyanate having C—C double bonds on the side chain.

According to one preferred embodiment, the average number of C—C double bond in the diisocyanate having C—C double bonds on the side chain is 1 to 6 per molecule, for example 1.5 to 6, 1.6 to 5, 1.7 to 4, 1.8 to 3, 1.9 to 2.5 per molecule or about 2 per molecule, preferably 1.5 to 4 per molecule, for example 1.8 to 2.5 per molecule.

The amount of the diisocyanate having C—C double bond on the side chain can be in the range from 5 to 35% by weight, for example 6 to 35, 7 to 30, 8 to 25, 8 to 20, 8 to 15% by weight, preferably 8 to 20% by weight, based on the total weight of the isocyanate component and the polyol component.

In one preferred embodiment, the isocyanate component can comprise at least one further isocyanate and said further isocyanate is diisocyanate. The further diisocyanate can adjust the UV reactivity of the hotmelt. The further diisocyanate can be selected from aliphatic, aromatic and cycloaliphatic diisocyanates. Examples of aromatic diisocyanates are 2,4-tolylene diisocyanate (2,4-TDI), 4,4'-diphenylmethane diisocyanate (4,4'-MDI), 2,2'-diphenylmethane diisocyanate (2,2'-MDI), 2,4'-diphenylmethane diisocyanate (2,4'-MDI) and so-called TDI mixtures (mixtures of 2,4-tolylene diisocyanate and 2,6-tolylene diisocyanate).

Examples of aliphatic diisocyanates are 1,4-butylene diisocyanate, 1,12-dodecamethylene diisocyanate, 1,10-decamethylene diisocyanate, 2-butyl-2-ethylpentamethylene diisocyanate, 2,4,4-trimethylhexamethylene diisocyanate or 2,2,4-trimethylhexamethylene diisocyanate and in particular hexamethylene diisocyanate (HDI).

Examples of cycloaliphatic diisocyanates are isophorone diisocyanate (IPDI), 2-isocyanatopropylcyclohexyl isocyanate, 2,4'-methylenebis(cyclohexyl) diisocyanate and 4-methylcyclohexane 1,3-diisocyanate (H-TDI).

Further examples of isocyanates having groups of differing reactivity are 1,3-phenylene diisocyanate, 1,4-phenylene diisocyanate, 1,5-naphthylene diisocyanate, diphenyl diisocyanate, tolidine diisocyanate and 2,6-tolylene diisocyanate.

The amount of the further diisocyanate can be in the range from 0 to 20% by weight, for example 5 to 20 or 10 to 20 or 8 to 15% by weight, preferably 8 to 20% by weight, based on the total weight of the isocyanate component and the polyol component.

According to one preferred embodiment, the polyol component comprises at least one crystalline polyester polyol and/or at least one non-crystalline polyester polyol.

The non-crystalline polyester polyols have no melting point and have a glass transition temperature (Tg) of at least −50° C. The crystalline Polyester polyols have a melting point, the melting point being preferably at least 5° C., more preferably at least 10° C.

The glass transition temperature and the melting point can be measured according to DIN 53765.

Crystalline polyester polyol can be prepared from the reaction of one or more linear aliphatic dicarboxylic acids with at least 2 carbon atoms, preferably at least 6 carbon atoms, particularly preferably 6 to 14 carbon atoms, such as adipic acid, azelaic acid, sebacic acid or dodecanedioic acid, with one or more linear diols having at least 2 carbon atoms at least 4 carbon atoms, more preferably 4 to 6 carbon atoms, 1,4-butanediol and 1,6-hexanediol. Also suitable are polycaprolactone.

The molecule weight of the crystalline polyester polyol can be in the range from 500 to 8000 g/mol, preferably 1500 to 5000 g/mol.

According to one embodiment, the crystalline polyester polyol has a hydroxyl number in the range from 15 to 50 mg KOH/g, preferably from 20 to 40 mg KOH/g.

The amount of crystalline polyester polyol can be in the range from 4 to 80% by weight, for example 4 to 70, 4 to 60, 4 to 50, 8 to 70, 8 to 60, 10 to 70, 10 to 60, 12 to 50, 12 to 40, 12 to 30, 12 to 20% by weight, preferably 10 to 65% by weight, based on the total weight of the isocyanate component and the polyol component.

Non-crystalline polyester polyols can be prepared from the reaction of one or more carboxylic acid components selected from adipic acid, isophthalic acid and terephthalic acid with one or more alcohol components selected from ethylene glycol, diethylene glycol, propylene glycol and neopentyl glycol.

The molecule weight of the non-crystalline polyester polyol can be in the range from 500 to 8000 g/mol, preferably 1500 to 5000 g/mol.

According to one embodiment, the non-crystalline polyester polyol has a hydroxyl number in the range from 10 to 80 mg KOH/g, preferably 20 to 50 mg KOH/g.

The amount of non-crystalline polyester polyol can be in the range from 1 to 30% by weight, for example 2 to 25, 4 to 20, 6 to 15% by weight, preferably 2 to 15% by weight, based on the total weight of the isocyanate component and the polyol component.

In one embodiment, the polyol component comprises at least one crystalline polyether polyol. The crystalline polyether polyol has a melting point, the melting point being preferably at least 5° C., more preferably at least 10° C.

The crystalline polyether polyol comprises, for example poly(oxypropylene) polyol and polytetrahydrofuran.

The molecule weight of the crystalline polyether polyol can be in the range from 500 to 5000 g/mol, preferably 1000 to 3000 g/mol.

According to one embodiment, the crystalline polyether polyol has a hydroxyl number in the range from 30 to 200 mg KOH/g, preferably 50 to 120 mg KOH/g.

The amount of crystalline polyether polyol can be in the range from 0 to 75% by weight, for example 5 to 70, 10 to 70, 20 to 65, 30 to 60, 40 to 60% by weight, preferably from 5 to 60% by weight, based on the total weight of the isocyanate component and the polyol component.

In one embodiment, the polyol component comprise at least one non-crystalline polyether polyol. The non-crystalline polyether polyol has no melting point and have a glass transition temperature of at least −50° C.

Preferred non-crystalline polyether glycol(s) comprise one or more linear diol(s) in which the hydroxyl groups are separated by repeating tetramethylene and 2-methyl tetramethylene ether groups.

Examples of such glycols are a liquid (at room temperature) copolymers of tetrahydrofuran (THF) and 3-methyl-THF of the following structure:

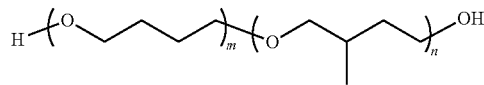

m+n=integer from 10 to 30; Mw about 3,500; OHav about 2.0; Tg −48° C.

The molecule weight of the non-crystalline polyether polyol can be in the range from 500 to 5000 g/mol, preferably 1000 to 3000 g/mol.

According to one embodiment, the non-crystalline polyether polyol has a hydroxyl number in the range from 30 to 300 mg KOH/g, preferably 50 to 120 mg KOH/g.

The amount of non-crystalline polyether polyol can be in the range from 0 to 10% by weight, for example 1 to 8% by weight, based on the total weight of the isocyanate component and the polyol component.

In a preferred embodiment, the polyurethane according to the present invention is obtained from the reaction of an isocyanate component with a polyol component, wherein isocyanate component comprises:

5 to 35% by weight, preferably 8 to 20% by weight of the diisocyanate having C—C double bonds on the side chain;

0 to 20% by weight, preferably 8 to 20% by weight of at least one further isocyanate and said further isocyanate being diisocyanate;

and the polyol component comprises:

8 to 80% by weight, preferably 12 to 65% by weight of at least one crystalline polyester polyol;

1 to 30% by weight, preferably 2 to 15% by weight of at least one non-crystalline polyester polyol;

0 to 60% by weight, preferably 5 to 60% by weight of at least one crystalline polyether polyol;

0 to 10% by weight of at least one non-crystalline polyether polyol;

Wherein the weight % is based on total weight of the isocyanate component and the polyol component.

In another preferred embodiment, the polyurethane according to the present invention is obtained from the reaction of an isocyanate component with a polyol component, wherein isocyanate component comprises:

5 to 35% by weight, preferably 8 to 20% by weight of the diisocyanate having C—C double bonds on the side chain;

0 to 20% by weight, preferably 8 to 20% by weight of at least one further isocyanate and said further isocyanate being diisocyanate;
and
the polyol component comprises:
4 to 80% by weight, preferably 10 to 65% by weight of at least one crystalline polyester polyol;
1 to 30% by weight, preferably 2 to 15% by weight of at least one non-crystalline polyester polyol;
0 to 75% by weight, preferably 5 to 60% by weight of at least one crystalline polyether polyol;
0 to 10% by weight of at least one non-crystalline polyether polyol;
wherein the weight % is based on total weight of the isocyanate component and the polyol component.

Usually, the polyols used in the polyol component, for example crystalline polyester polyol, non-crystalline polyester polyol, crystalline polyether polyol and non-crystalline polyether polyol have a functionality of 2.

Another aspect of the present invention is directed to a method for preparing the polyurethane of the present invention, which comprises reacting the isocyanate component with the polyol component to obtain the polyurethane having an isocyanate group and having C—C double bonds on the side chain, wherein the isocyanate component comprises at least one diisocyanate having C—C double bonds on the side chain.

In one preferred embodiment, the polyol component can be heated to melt all polyols. Then, isocyanate component is added to carry out the reaction. The reaction temperature can be in the range from 60 to 130° C., preferably from 90 to 110° C.

A further aspect of the present invention is directed to an UV-moisture dual cure polyurethane reactive hotmelt, which comprises at least one polyurethane of the present invention.

According to one preferred embodiment, the UV-moisture dual cure polyurethane reactive hotmelt further comprises at least one photoinitiator.

Suitable photoinitiators include for example those which do not degrade under the application temperature of the UV-moisture dual cure polyurethane reactive hotmelt. Examples of the photoinitiator include an acylphosphine oxide compound, a benzophenone compound, an acetophenone compound, an oxime ester compound, a benzoin compound, especially a benzoin ether compound, thioxanthone, and the like. According to a preferred embodiment, the photoinitiator is 2,4,6-trimethylbenzoyldiphenylphosphine oxide.

The amount of photoinitiator can be in the range from 0.1 to 3% by weight, preferably 0.5 to 1.5% by weight, based on the total weight of the PU reactive hotmelt.

According to a preferred embodiment, the UV-moisture dual cure polyurethane reactive hotmelt of the present invention can have a Brookfield viscosity of less than 7 Pas, for example less than 6 Pas or less than 5 Pas measured at 110° C.

According to another preferred embodiment, the UV-moisture dual cure polyurethane reactive hotmelt of the present invention can have a Brookfield viscosity of less than 15 Pas, for example less than 14 Pas or less than 12 Pas or less than 10 Pas measured at 90° C.

In one embodiment, the UV-moisture dual cure polyurethane reactive hotmelt of the present invention can comprise at least one urea reaction catalyst to promote the reaction of isocyanate group with moisture.

Useful catalysts include for example all catalysts typically used in polyurethane chemistry.

Catalysts typically used in polyurethane chemistry are preferably organic amines, especially tertiary aliphatic, cycloaliphatic or aromatic amines.

As customary organic amines there may be mentioned by way of example: triethylamine, 1,4-diazabicyclo[2,2,2]octane, tributylamine, dimethylbenzylamine, N,N,N',N'-tetramethylethylenediamine, N,N,N',N'-tetramethylbutane-1,4-diamine, N,N,N',N'-tetramethylhexane-1,6-diamine, dimethylcyclohexylamine, dimethyldodecylamine, pentamethyldipropylenetriamine, pentamethyldiethylenetriamine, 3-methyl-6-dimethylamino-3-azapentol, dimethylaminopropylamine, 1,3-bisdimethylaminobutane, bis(2-dimethylaminoethyl) ether, N-ethylmorpholine, N-methylmorpholine, N-cyclohexylmorpholine, 2-dimethylaminoethoxyethanol, dimethylethanolamine, tetramethylhexamethylenediamine, dimethylamino-N-methylethanolamine, N-methylimidazole, N-formyl-N,N'-dimethylbutylenediamine, N-dimethylaminoethyl-morpholine, 3,3'-bisdimethylamino-di-n-propylamine and/or 2,2'-dipiparazine diisopropyl ether, dimethylpiparazine, tris(N,N-dimethylaminopropyl)-s-hexahydrotriazine, imidazoles such as 1,2-dimethylimidazole, 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole, 1-(3-aminopropyl)-2-methylimidazole, and/or 2,2'-dimorpholinodiethylether.

It will be appreciated that mixtures of two or more of the aforementioned compounds may be used as urea reaction catalysts as well.

The amount of urea reaction catalyst can be in the range from 0 to 0.05% by weight or 0.01 to 0.04% by weight, based on the total weight of the hotmelt.

The hotmelt of the present invention preferably comprises at least one further additive selected from tackifiers, stabilizers, fillers, flow control agents, thickeners, wetting agents, defoamers, crosslinkers, plasticizers, ageing inhibitors, fungicides, pigments, dyes, matting agents, and neutralizing agents. The hotmelt preferably comprises from 20 to 90% by weight of one or more polyurethane of the invention as described herein and at least 10% by weight of one or more tackifiers, based on the total amount of the hotmelt.

Tackifiers are known per se to the skilled person. They are additives for adhesives or elastomers that improve the autoadhesion (tack, intrinsic stickiness, self-adhesion) of these systems. They generally have a relatively low molar mass (Mn about 200-2000 g/mol), a glass transition temperature which lies above that of the elastomers. The amount by weight of the tackifiers is preferably 5 to 100 parts by weight, more preferably 10 to 50 parts by weight, per 100 parts by weight of the polyurethane. Suitable tackifiers are, for example, those based on natural resins, such as rosins, for example. Tackifiers based on natural resins include the natural resins themselves and also their derivatives formed, for example, by disproportionation or isomerization, polymerization, dimerization or hydrogenation. They may be present in their salt form (with, for example, monovalent or polyvalent counterions (cations)), or, preferably, in their esterified form. Alcohols used for the esterification may be monohydric or polyhydric. Examples are methanol, ethanediol, diethylene glycol, triethylene glycol, 1,2,3-propanetriol, and pentaerythritol. Also finding use as tackifiers, furthermore, are phenolic resins, hydrocarbon resins, e.g., coumarone-indene resins, polyterpene resins, terpene oligomers, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, vinyltoluene. Also being used increasingly as tackifiers are polyacrylates which have a low molar weight. These polyacrylates preferably have a weight-average molecular weight (Mw) of below 30 000. The polyacrylates are composed preferably to an extent of at least 60%, more particularly at least 80%, by weight of C1-C8 alkyl (meth)acrylates. Preferred tackifiers are natural or chemically modified rosins. Rosins are composed predominantly of abietic acid or derivatives thereof.

For improved surface wetting, the hotmelt may in particular comprise wetting assistants, examples being fatty alcohol ethoxylates, alkylphenol ethoxylates, sulfosuccinic esters, nonyl-phenol ethoxylates, polyoxyethylenes/-propylenes or sodium dodecyl-sulfonates. The amount is generally 0.05 to 5 parts by weight, more particularly 0.1 to 3 parts by weight, per 100 parts by weight of polymer (solid).

Suitable stabilizers are e.g. selected from the group encompassing wetting agents, cellulose, polyvinyl alcohol, polyvinylpyrrolidone, and mixtures thereof.

Another aspect of the present invention is directed to a method for preparing the UV-moisture dual cure polyurethane reactive hotmelt of the present invention, which comprises mixing the polyurethane of the present invention with at least one photoinitiator.

The above mentioned at least one additive can also be added before, during or after the addition of the photoinitiator.

The resulted hotmelt is kept free from light and water.

A further aspect of the present invention is directed to a method for adhesively bonding substrates, wherein
a) a hotmelt of the invention as described herein is provided,
b) the hotmelt is applied to at least a first substrate, and
c) the substrate coated with the hotmelt is contacted with a coated or un-coated second substrate, and the applied hotmelt is cured by UV light and moisture before or after the two substrates are contacted with one another. The substrates may be selected, for example, from polymer films, paper, metal foils, wood veneer, fiber nonwovens made of natural synthetic fibers, shaped solid articles, examples being shaped parts made of metal, painted metal, wood, woodbase materials, fiber materials or plastic. Particularly preferred first substrates are polymer films. Polymer films are, more particularly, flexible sheetlike plastics in a thickness of 0.05 millimeter to 5 millimeters, which can be rolled up. Polymeric films of this kind are produced typically by coating, casting, calendering or extrusion and are typically available commercially in rolls or are produced on site. They may be of single-layer or multilayer construction. The plastic of the polymer films is preferably a thermoplastic, e.g., polyesters, such as polyethylene terephthalate (PET), thermoplastic polyolefins (TPO) such as polyethylene, polypropylene, polyvinyl chloride, especially plasticized PVC, polyacetates, ethylene/vinylacetate copolymers (EVA), ASA (acrylonitrile/styrene/acrylate), PU (polyurethane), PA (polyamide), poly(meth)acrylates, polycarbonates, or their plastics alloys, including, in particular foamed PVC films and foamed thermoplastic polyolefin films (TPO). Particularly preferred are PVC and thermoplastic polyolefins (TPO). The shaped parts may also be moldings composed of synthetic or natural fibers or chips bound together by a binder to form a molding; also suitable in particular are moldings made of plastic, e.g., ABS. The moldings may have any desired shape.

The substrates or moldings can be coated with the hotmelt by customary application techniques, as for example by spraying, spreading, knife coating, die application, roll application or casting application methods.

The amount of hotmelt applied is preferably 0.5 to 100 $g/m^2$, more preferably 2 to 80 $g/m^2$, very preferably 10 to 70 $g/m^2$.

A further aspect of the present invention is directed to a method for manufacturing a three-dimensional object by using the UV-moisture dual cure polyurethane reactive hotmelt of the present invention.

According to a preferred embodiment, the method for manufacturing a three-dimensional object comprises a step of forming a layer of UV-moisture dual cure polyurethane reactive hotmelt of the present invention and irradiating the layer with the UV light to set the layer, repeating the step until the three-dimensional object is formed.

According to one preferred embodiment, the method is an additive manufacturing method.

A further aspect of the present invention is directed to a three-dimensional object obtainable by the method of the present invention.

The UV-moisture dual cure polyurethane reactive hotmelt of the present invention has following advantages: low viscosity for fast and easy application; short setting time, and good green strength; and the cured product, especially the three-dimensional object produced from the hotmelt by the additive manufacturing method has high toughness (high impact strength).

EXAMPLE

A) Substances Used
crystalline Polyester polyol: synthesized from adipic acid and hexane diol with molecular weight 3500, hydroxyl number 30 mg KOH/g, functionality 2;
non-crystalline Polyester polyol: Dynacoll® 7230 from Evonik, molecular weight 3500 g/mol, hydroxyl number 27-34 mg KOH/g, Tg −30° C., functionality 2;
diisocyanate having carbon-carbon double bonds on the side chain: low-viscous isocyanate-functional unsaturated aliphatic acrylic ester (CAS(78567-28-9)); the average number of C—C double bond is about 2 per molecule; the number of isocyanate group is 2 per molecule and the molecular weight is about 800 g/mol;
crystalline Polyether polyol: polyTHF 2000, molecular weight 2000 g/mol, hydroxyl number about 55 mg KOH/g, functionality 2;
diisocyanate: 4,4'-MDI;
photoinitiator: Irgacure TPO (2,4,6-trimethylbenzoyldiphenylphosphine oxide);
B) Test Methods
B1) Green Strength
DIN EN 1465
1. Preheating the sample (sealed in a toothpaste tube) in an oven at 100° C. for 0.5 hour.
2. Marking on the transparent PMMA substrate ($1^{st}$ substrate) with 12.5 mm*25 mm area for sample application (bonding area), and not marking the adhesion surface.
3. Applying the sample onto the bonding area of the $1^{st}$ substrate; the thickness of the sample being 0.2 mm.
4. Putting the second substrate onto the sample within less than 20 seconds and keeping this time the same for all samples.
5. Pressing both substrates with a 0.5 kg iron bar to squeeze out the excess hotmelt, wherein t=0 second is the time when the bar was put onto the samples; then immediately irradiating the jointed substrates with UV light (Technigraf UN50049-0002) for 10 s for the samples from example 1, example 2 and comparative example 2 (for the sample from comparative example 1, no UV irradiation is applied as this sample doesn't comprise C—C double bond).

6. Measuring the tensile strength after given time (depending on the open time of the recipe) by universal machine (from Zwick) and recording the value as green strength. Time of green strength is the time from t=0 to the time beginning the measurement. During the sample preparation and testing, the relative humidity is 50%.

B2) Setting Time and Open Time

1. Preheating the PU RHM sample (sealed in a toothpaste tube) in heating oven at 100° C. for 0.5 h.
2. Preheating the Teflon paper substrate and scraper on the heating table at 100° C.
3. Making a piece of 500 μm thick PU RHM film with the scraper on the Teflon paper substrate and starting timing simultaneous as t=0 second; and putting the Teflon paper with PU RHM on the conveyor belt of the UV lamp (Technigraf UN50049-0002) and irradiating the PU RHM during conveying (for the sample from comparative example 1, no UV irradiation is applied as this sample doesn't comprise C—C double bond).
4. After UV irradiating, immediately transferring the PU RHM film onto the fume hood table at room temperature, and using paper test method to tap the film's surface with small slices of papers at certain time intervals to check whether it is tacky; keeping the PU RHM film in the humidity chamber at 50% R.H.
5. Recording the duration until the RHM set the shape as setting time.
6. Recording the duration until the surface is not tacky as open time.

B3) Viscosity

Viscometer (Brookfield).

1. Sample preparation: Heating the sample (sealed in a toothpaste tube) in the preheated oven at 100° C. for 30 min.
2. Turning on the main switch of Brookfield viscometer and temperature controller (Located in the rear of the machine) to preheating machine.
3. Removing the protector of the spindle, calibrating the viscometer and setting the parameters with the guidance on the screen.
4. In the meantime, putting the aluminum sample tube into the heating chamber and preheating it to 70° C.
5. Filling the sample into the preheated aluminum tube till ⅔ full.
6. Placing the sample tube in the heating chamber. Raising the viscometer motor, installing the corresponding rotor. Lowering the motor and let the rotor into the sample tube. Adjusting the position of the heating chamber to avoid the rotor touching the tube wall. Covering the heating chamber with the lid.
7. Setting the required temperature on the temperature controller, clicking "SET" key to enter the setting mode, clicking the up or down keys to set the temperature, clicking "SET" again to confirm the setting, clicking "RUN" key to confirm running the test at the set temperature.
8. Increasing the rotational speed gradually on the display after the temperature of the heating chamber is stabilized at the set temperature. Clicking "RUN" key to run the viscometer and observing the torque reading. Stopping the viscosity measurement and resetting the rotational speed if the torque does not reach 70% or exceed 90%. After the viscosity measurement is finished, pressing the page up or down key to record the data.

B4) Impact Strength

ISO 179

1. The sample was applied onto a Teflon impact sample mold. Glass slides were used to scratch and ensure the mold was completely filled with the sample.
2. The mold with the sample was irradiated with UV light for 10 s (582 mJ/cm$^2$) (for the sample from comparative example 1, no UV irradiation is applied as this sample doesn't comprise C—C double bond).
3. The mold with the sample was then kept in the humidity chamber at 50% R.H. at 25° C. for 24 hours to achieve fully moisture cure.
4. The molded sample taken out from the mold and the impact strength of the molded sample was tested.

Example 1

107 g crystalline Polyester polyol, 53 g non-crystalline Polyester polyol, and 374 g crystalline Polyether polyol were added into a 1 L reactor. Then, the reactor was sealed. The polyols were heated to 80° C. to melt all the polyols.

The polyols were dried under dynamic vacuum under mechanically stirring until there were no visible bubbles.

66 g diisocyanate with carbon-carbon double bonds on the side chain and 99 g 4,4'-MDI were added into the reactor under mechanically stirring.

The reactants were heated to 100° C. and the temperature was maintained for 1.5 hours under mechanically stirring, to produce the polyurethane.

7 g photoinitiator was added to the polyurethane and the mixture was stirred for another 0.5 hour to ensure uniform distribution of the photoinitiator in the polyurethane. Finally, the UV-moisture dual cure PU reactive hotmelt (RHM) was obtained.

The UV-moisture dual cure PU RHM was packed into aluminium bags and sealed under vacuum. The aluminium bags were stored in dark.

The green strength, setting time and open time of the UV-moisture dual cure PU RHM were tested according to the above mentioned methods, the testing results and the NCO content are shown in Table 1. The setting time and open time of the UV-moisture dual cure PU RHM without applying UV irradiation were 2 h and 4 h respectively. The viscosity of the UV-moisture dual cure PU RHM was tested according to the above mentioned methods and the results were shown in table 2. The impact strength is shown in table 3.

Example 2

441 g crystalline Polyester polyol and 26 g non-crystalline Polyester polyol were added into a 1 L reactor. Then, the reactor was sealed. The polyols were heated to 80° C. to melt all the polyols.

The polyols were dried under dynamic vacuum under mechanically stirring until there were no visible bubbles.

226 g diisocyanate with carbon-carbon double bonds on the side chain was added into the reactor under mechanically stirring.

The reactants were heated to 100° C. and the temperature was maintained for 1.5 hours under mechanically stirring, to produce the polyurethane.

7 g photoinitiator was added to the polyurethane and the mixture was stirred for another 0.5 hour to ensure uniform distribution of the photoinitiator in the polyurethane. Finally, the UV-moisture dual cure PU RHM was obtained.

The UV-moisture dual cure PU RHM was packed into aluminium bags and sealed under vacuum. The aluminium bags were stored in dark.

The green strength, setting time and open time of the UV-moisture dual cure PU RHM were tested according to the above mentioned methods and the testing results and NCO content are shown in Table 1. Both the setting time and open time of the UV-moisture dual cure PU RHM without applying UV irradiation were 60 s. The viscosity of the UV-moisture dual cure PU RHM was tested according to the above mentioned methods and the results are shown in table 2.

Example 3

438 g crystalline Polyester polyol were added into a 1 L reactor. Then, the reactor was sealed. The polyol was heated to 80° C. to melt all the polyols.

The polyol was dried under dynamic vacuum under mechanically stirring until there were no visible bubbles.

242 g diisocyanate with carbon-carbon double bonds on the side chain was added into the reactor under mechanically stirring.

The reactants were heated to 100° C. and the temperature was maintained for 1.5 hours under mechanically stirring, to produce the polyurethane.

21 g photoinitiator was added to the polyurethane and the mixture was stirred for another 0.5 hour to ensure uniform distribution of the photoinitiator in the polyurethane. Finally, the UV-moisture dual cure PU RHM was obtained.

The UV-moisture dual cure PU RHM was packed into aluminium bags and sealed under vacuum. The aluminium bags were stored in dark.

The NCO content of the UV-moisture dual cure PU RHM was 3.3 wt %. The setting time and open time of the UV-moisture dual cure PU RHM were tested according to the above mentioned methods. When the UV irradiating time was 10 s (UV irradiation dose 582 mJ/cm$^2$), the setting time was 5 s and the open time was 25 s. When the UV irradiating time was reduced to 0.75 s (UV irradiation dose 96 mJ/cm$^2$), the setting time and open time maintained unchanged. The viscosity of the UV-moisture dual cure PU reactive hotmelt was tested according to the above mentioned methods and the result is shown in table 2.

Example 4

35 g crystalline Polyester polyol and 510 g crystalline Polyether polyol were added into a 1 L reactor. Then, the reactor was sealed. The polyols were heated to 80° C. to melt all the polyols.

The polyols were dried under dynamic vacuum under mechanically stirring until there were no visible bubbles.

35 g diisocyanate with carbon-carbon double bonds on the side chain and 122 g 4,4'-MDI were added into the reactor under mechanically stirring.

The reactants were heated to 100° C. and the temperature was maintained for 1.5 hours under mechanically stirring, to produce the polyurethane.

7 g photoinitiator was added to the polyurethane and the mixture was stirred for another 0.5 hour to ensure uniform distribution of the photoinitiator in the polyurethane. Finally, the UV-moisture dual cure PU RHM was obtained.

The UV-moisture dual cure PU RHM was packed into aluminium bags and sealed under vacuum. The aluminium bags were stored in dark.

The NCO content of the UV-moisture dual cure PU RHM was 3.3 wt %. The setting time and open time of the UV-moisture dual cure PU RHM were tested according to the above mentioned methods. When the UV irradiating time was 10 s (UV irradiation dose 582 mJ/cm$^2$), the setting time was 20 s and the open time was 2.5 h. The viscosity of the UV-moisture dual cure PU reactive hotmelt was tested according to the above mentioned methods and the result is shown in table 2.

Comparative Example 1

107 g crystalline Polyester polyol, 53 g non-crystalline Polyester polyol, and 374 g crystalline Polyether polyol were added into a 1 L reactor; Then, the reactor was sealed; polyols were heated to 80° C. to melt all the polyols.

The polyols were dried under dynamic vacuum udder mechanically stirring until there were no bubbles visible.

125 g 4,4'-MDI was added to the reactor under mechanically stirring.

The reactants were heated to 100° C. and the temperature was maintained for 2 hours under mechanically stirring, to produce the standard polyurethane, i.e. the standard PU RHM.

The standard PU RHM was packed into aluminium bags and sealed under vacuum. The aluminium bags were stored in dark.

The green strength, setting time and open time of the standard PU RHM were tested according to the above mentioned methods and the testing results and NCO content are shown in Table 1. The viscosity of the standard PU RHM was tested according to the above mentioned method and the results were shown in table 2. The impact strength is shown in table 3.

Comparative Example 2

The production of prepolymer: 815 g HDI trimer (Basonat HI) was reacted with 184 g Hydroxyethyl methacrylate at 65° C. for 2 h, the resulted prepolymer has an NCO content of 13.5%.

104 g crystalline Polyester polyol, 52 g non-crystalline Polyester polyol, and 364 g crystalline Polyether polyol were added into a 1 L reactor. Then, the reactor was sealed; the polyols were heated to 80° C. to melt all the polyols.

The polyols were dried under dynamic vacuum under mechanically stirring until there were no bubbles visible.

71 g prepolymer prepared above and 97 g 4,4'-MDI were added to the reactor under mechanically stirring. The reactants were heated to 100° C. and the temperature was maintained for 1.5 hours under mechanically stirring, to produce the polyurethane.

7 g photo initiator was added to the polyurethane and the mixture was stirred for another 0.5 hour to ensure uniform distribution of the photoinitiator in the polyurethane. Finally, the UV-moisture dual cure PU RHM was obtained.

The UV-moisture dual cure PU RHM was packed into aluminium bags and sealed under vacuum. The aluminium bags were stored in dark.

The green strength, setting time and open time of the UV-moisture dual cure PU RHM were tested according to the above mentioned methods and the testing results and NCO content are shown in Table 1. The setting time and open time of the UV-moisture dual cure PU RHM without applying UV irradiation were 40 min and 4 h respectively. The viscosity of the UV-moisture dual cure PU RHM was tested according to the above mentioned method and the results were shown in table 2. The impact strength is shown in table 3.

TABLE 1

| Samples | NCO content (wt %) | UV irradiation (time) | Setting time | Open time | Green strength (MPa) | | | |
|---|---|---|---|---|---|---|---|---|
| | | | | | 23 min | 1.5 h | 3 h | 5 h |
| Comparative example 1(Standard) | 3.3 | — | 60 min | 100 min | 0.009 | 0.009 | 0.009 | 0.075 |
| Example 1 | 3.3 | 582 mJ/cm² (10 s) | 10 s | 4 h | 0.719 | 0.791 | 1.11 | 1.09 |
| Example 2 | 3.2 | 582 mJ/cm² (10 s*) | 10 s | 70 s | 0.332 | 0.375 | 0.333 | 0.362 |
| Comparative Example 2 | 3.3 | 582 mJ/cm² (10 s) | 10 s | 3 h | 0.062 | 0.082 | 0.081 | 0.189 |

*In example 2, when the UV irradiating time was reduced to 3 s (UV irradiation dose 133 mJ/cm²), the setting time, open time and green strength mantianed unchanged.

TABLE 2

| Example | viscosity at 90° C. (Pas) |
|---|---|
| Comparative example 1 (standard) | 5.7 |
| Example 1 | 8.1 |
| Example 2 | 13.5 |
| Comparative example 2 | 20.2 |
| Example 3 | 9.6 |
| Example 4 | 4.6 |

TABLE 3

| Example | Impact strength (charpy, notched) [KJ/m²] |
|---|---|
| Comparative example 1 (standard) | 15.7 |
| example 1 | 16.4 |
| comparative example 2 | 9.88 |

The viscosities of the UV-moisture dual cure PU RHM from example 1 is similar with that of the standard PU RHM from comparative example 1; however, the viscosity of the UV-moisture dual cure PU RHM from comparative example 2 is much higher than those of standard PU RHM and the UV-moisture dual cure PU RHMs from examples 1 to 4. The high viscosity is disadvantageous to the application of the hotmelt.

The setting time of the UV-moisture dual cure PU RHM from example 1 without UV irradiation is 2 h, however it can be set within 10 s upon applying 10 s-UV irradiation, this property is advantageous to hotmelt. In examples 2 and 3, even the UV irradiating times were further reduced, the setting time, open time or green strength maintained unchanged comparing with a 10 s UV irradiation time, which means the UV-moisture dual cure PU RHM from examples 2 and 3 have higher reactivity.

The UV-moisture dual cure PU RHM from example 1 can remain tacky for up to 4 h (open time).

The dual cure PU RHMs from examples 1 and 2 have excellent green strength, especially the Dual cure PU RHM from example 1.

The impact strength of the dual cure PU reactive hotmelt from example 1 is higher than that of the standard PU reactive hotmelt from comparative example 1 and is much higher than that of the UV-moisture dual cure PU reactive hotmelt from the comparative example 2.

The invention claimed is:

1. A UV-moisture dual cure polyurethane reactive hotmelt comprising (i) at least one polyurethane which has an isocyanate group and has C—C double bonds on a side chain and (ii) at least one photoinitiator, wherein an isocyanate in an isocyanate component for synthesizing the at least one polyurethane is diisocyanate and the isocyanate component comprises at least one diisocyanate having C—C double bonds on a side chain.

2. The UV-moisture dual cure polyurethane reactive hotmelt according to claim 1, wherein the amount of the C—C double bond is 0.07 to 0.5 mol/kg, based on the total weight of the at least one polyurethane.

3. The UV-moisture dual cure polyurethane reactive hotmelt according to claim 1, wherein the content of isocyanate groups is in the range from 0.2 to 6% by weight, based on the total weight of the at least one polyurethane.

4. The UV-moisture dual cure polyurethane reactive hotmelt according to claim 1, wherein the at least one polyurethane is obtained from the reaction of the isocyanate component with a polyol component.

5. The UV-moisture dual cure polyurethane reactive hotmelt according to claim 1, wherein the average number of C—C double bonds in the diisocyanate having C—C double bonds on the side chain is 1 to 6 per molecule.

6. The UV-moisture dual cure polyurethane reactive hotmelt according to claim 1, wherein the amount of the diisocyanate having C—C double bonds on the side chain is in the range from 5 to 35% by weight, based on the total weight of the isocyanate component and the polyol component.

7. The UV-moisture dual cure polyurethane reactive hotmelt according to claim 1, wherein the isocyanate component comprises at least one further isocyanate and said further isocyanate is diisocyanate.

8. The UV-moisture dual cure polyurethane reactive hotmelt according to claim 4, wherein the polyol component comprises at least one crystalline polyester polyol and/or at least one non-crystalline polyester polyol.

9. The UV-moisture dual cure polyurethane reactive hotmelt according to claim 8, wherein the crystalline polyester polyol has a hydroxyl number in the range from 15 to 50 mg KOH/g.

10. The UV-moisture dual cure polyurethane reactive hotmelt according to claim 8, wherein the non-crystalline polyester polyol has a hydroxyl number in the range from 10 to 80 mg KOH/g.

11. The UV-moisture dual cure polyurethane reactive hotmelt according to claim 8, wherein the amount of crystalline polyester polyol is in the range from 4 to 80% by weight, based on the total weight of the isocyanate component and the polyol component.

12. The UV-moisture dual cure polyurethane reactive hotmelt according to claim 8, wherein the amount of non-crystalline polyester polyol is in the range from 1 to 30% by weight, based on the total weight of the isocyanate component and the polyol component.

13. The UV-moisture dual cure polyurethane reactive hotmelt according to claim 4, wherein the polyol component comprises 0 to 75% by weight of at least one crystalline polyether polyol.

14. The UV-moisture dual cure polyurethane reactive hotmelt according to claim 4, wherein the polyol component comprises 0 to 10% by weight of at least one non-crystalline polyether polyol.

15. The UV-moisture dual cure polyurethane reactive hotmelt according to claim 4, wherein said isocyanate component comprises:
- 5 to 35% by weight of the diisocyanate having C—C double bonds on the side chain;
- 0 to 20% by weight of at least one further isocyanate and said further isocyanate being diisocyanate;

and the polyol component comprises:
- 8 to 80% by weight of at least one crystalline polyester polyol;
- 1 to 30% by weight of at least one non-crystalline polyester polyol;
- 0 to 60% by weight of at least one crystalline polyether polyol; and
- 0 to 10% by weight of at least one non-crystalline polyether polyol;
- wherein the weight % is based on total weight of the isocyanate component and the polyol component.

16. The UV-moisture dual cure polyurethane reactive hotmelt according to claim 4, wherein said isocyanate component comprises:
- 5 to 35% by weight of the diisocyanate having C—C double bonds on the side chain;
- 0 to 20% by weight of at least one further isocyanate and said further isocyanate being diisocyanate;

and the polyol component comprises:
- 4 to 80% by weight of at least one crystalline polyester polyol;
- 1 to 30% by weight of at least one non-crystalline polyester polyol;
- 0 to 75% by weight of at least one crystalline polyether polyol; and
- 0 to 10% by weight of at least one non-crystalline polyether polyol;
- wherein the weight % is based on total weight of the isocyanate component and the polyol component.

17. The UV-moisture dual cure polyurethane reactive hotmelt according to claim 4, wherein the polyols used in the polyol component have a functionality of 2.

18. The UV-moisture dual cure polyurethane reactive hotmelt according to claim 1, which further comprises at least one urea reaction catalyst.

19. A method of using the UV-moisture dual cure polyurethane reactive hotmelt according to claim 1, the method comprising using the UV-moisture dual cure polyurethane reactive hotmelt as an adhesive or in additive manufacturing.

20. A method for manufacturing a three-dimensional object, the method comprising using the UV-moisture dual cure polyurethane reactive hotmelt as defined in claim 1 to manufacture the three-dimensional object.

21. The method according to claim 20, which comprises a step of forming a layer of the UV-moisture dual cure polyurethane reactive hotmelt as defined in claim 1 and irradiating the layer with the UV light to set the layer, repeating the step until the three-dimensional object is formed.

22. The method according to claim 21, wherein the method is an additive manufacturing (3D printing) method.

23. A three-dimensional object obtained by the method according to claim 20.

\* \* \* \* \*